(12) United States Patent
Martin et al.

(10) Patent No.: US 6,697,877 B1
(45) Date of Patent: Feb. 24, 2004

(54) METHOD AND APPARATUS FOR DETERMINING EQUALITY OF OBJECTS IN A DISTRIBUTED OBJECT ENVIRONMENT

(75) Inventors: Bruce E. Martin, Brisbane, CA (US); Jefferson A. Dinkins, Sunnyvale, CA (US); Mark W. Hapner, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/891,181

(22) Filed: Jul. 10, 1997

Related U.S. Application Data

(63) Continuation of application No. 08/408,634, filed on Mar. 22, 1995, now abandoned.

(51) Int. Cl.[7] .............................................. G06F 9/44
(52) U.S. Cl. ...................................................... 709/315
(58) Field of Search ................................. 395/680, 683, 395/681; 709/303, 700, 301, 315, 103 Y, 313, 310, 330, 203, 201

(56) References Cited

U.S. PATENT DOCUMENTS

| | | | |
|---|---|---|---|
| 4,905,162 A | | 2/1990 | Hartzband et al. .......... 364/513 |
| 5,057,996 A | | 10/1991 | Cutler et al. ................ 364/200 |
| 5,117,351 A | * | 5/1992 | Miller ........................ 395/650 |
| 5,129,083 A | | 7/1992 | Cutler et al. ................ 395/600 |
| 5,509,123 A | | 4/1996 | Dobbins et al. ........ 395/200.15 |
| 5,511,197 A | * | 4/1996 | Hill et al. ................... 395/683 |
| 5,522,077 A | * | 5/1996 | Cuthbert et al. ............ 395/700 |
| 5,619,638 A | | 4/1997 | Duggan et al. ............. 395/703 |
| 5,640,564 A | * | 6/1997 | Hamilton et al. ........... 395/683 |
| 5,815,710 A | * | 9/1998 | Martin et al. ............... 395/683 |

OTHER PUBLICATIONS

S. Khoshafian, et al, "Object Identify", OOPSLA'86, pp. (21), 1986.*

M. Nelson, et al, "Generic Support for Caching and Disconnected Operation", 4th Workshop on Workstation Operating Systems, pp. 61–65, Oct. 1993.*

OMG TC Document 94.5.5, Joint Object Services Submission, Relationship Service Specification, p. 23–48, May 30, 1994.*

(List continued on next page.)

*Primary Examiner*—Sue Lao
(74) *Attorney, Agent, or Firm*—Beyer Weaver & Thomas LLP

(57) ABSTRACT

A method and apparatus for managing relationships among objects in a distributed object environment includes a method and apparatus for determining whether two or more object references refer to identical objects; a method and apparatus for providing a unique identifier for an object; a method and apparatus for checking role types for the formation of relationships; and a method and apparatus for caching role and object locations in roles in a relationship. In the method and apparatus for determining whether two or more object references refer to the same object, a unique object identifier is compared to determine if the objects referred to by the object references are identical. The unique identifier is provided by concatenating information identifying the machine address of the process that created the object in addition to the process ID, the time of creation and a process counter. In the method and apparatus for checking role types, information including the number of roles and is passed to a relationship factory which determines whether the number, types and cardinality of the roles passed to the factory are consistent with the relationship object to be created. The method and apparatus also includes caching of object references and roles for objects related to a given object in that object's role. The methods and apparatus of the invention thus provide valuable tools for managing relationship among objects in a distributed object environment efficiently.

20 Claims, 14 Drawing Sheets

OTHER PUBLICATIONS

Jonathan Wilcox, Object Databases: object methods in distributed computing, Dr. Dohh, Journal, v19, n13, p26(6), Nov. 1994.*

Kraig Brockschmidt Microsoft Systems Journal, Implementing Windows Objects using either C or C++, Sep. 1993.*

Michael Powell, "Object,References, Identifiers, and Equality White Paper", (Jul. 2, 1993), OMG TC Document 93.7.5, pp. 1–24.*

A. Goscinski, Distributed Operating Systems The Logical Design, Addison–Wesley, pp. 306–313, 1991.*

Robert Orfali et al., Essential Client/Server Survival Guide, 1994, Chapters 21 & 22.

Martin, et al., "Relating Distributed Objects," 1994, Proceedings of the 20th VLDB Conference.

Groupe Bull, et al., "Joint Object Services Submission," May 30, 1994, Relationship Service Specification.

James Rumbaugh, "Relations as Semantic Constructs in an Object–Oriented Language," Oct. 4–8, 1987, OOPSLA Conference Proceedings.

* cited by examiner

METHOD AND APPARATUS FOR DETERMINING EQUALITY OF OBJECTS IN A DISTRIBUTED OBJECT ENVIRONMENT

This is a continuation, of application Ser. No. 08/408,634 filed Mar. 22, 1995 now abandoned.

BACKGROUND OF THE INVENTION

1. The Field of the Invention

The present invention relates to the fields of distributed computing systems, client-server computing and object-oriented programming. More specifically, the present invention includes a method and apparatus for managing objects that are associated through relationship objects in a distributed object environment.

2. The Relevant Art

Object oriented programming methodologies have received increasing attention over the past several years in response to the increasing tendency for software developed using traditional programming methods to be delivered late and over budget (Taylor 1990; Gibbs 1994). One problem with traditional programming techniques stems from the emphasis placed on procedural models and "linear" code that often is extremely difficult to design and maintain for many problems. Generally, large programs created using traditional methods are "brittle", that is, even small changes can effect all elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and or procedures of the object are relatively isolated from the remainder of the program. This provides code that is more easily maintained as compared to code written using traditional methods, as changes to an object's code do not affect the code in the other objects. In addition, the inherent modular nature of objects allows individual objects to be reused in different programs. Thus, programmers can develop libraries of "tried and true" objects that can be used over and over again in different applications. This increases software reliability while decreasing development time, as reliable programming code may be used repeatedly.

However, the full promise of object oriented methodologies, especially the advantages afforded by their modularity, have yet to be achieved. In particular, it would be highly desirable to allow programmers and other users access to objects in a transparent fashion so that objects created in different programming languages and objects residing on different computing platforms that are networked together are accessible to the user without extensive modification of the user's programming code.

Attempts to provide such facilities have been made using object oriented distributed systems that are based upon a client-server model, in which object-servers provide interfaces to object-clients that make requests of the object-servers. Typically in such systems, these servers are objects consisting of data and associated methods. The object-clients obtain access to the functionalities of the object-servers by executing calls on them, which calls are mediated by the distributed system. When the object-server receives the call it executes the appropriate method and transmits the result back to the object-client. The object-client and object-server communicate through an Object Request Broker (ORB) which is used to locate the various distributed objects and establish communications therebetween (Rao 1993).

The object metaphor in distributed systems is a useful technique as it separates the object's interface from its implementation; thus allowing software designers to take advantage of the functionalities of various objects available to them without having to worry about the details of the object's implementation. The programmer need only be aware of the object's interface. In addition, object oriented distributed systems allow for multiple implementations of a single interface, which interface may reside on different computing platforms that have been connected through a network. Thus, a programmer working on one machine of a network may make a call to an object about which the programmer has no detailed knowledge with the confidence that at the appropriate time that the remote object will be accessed and return its data so that the programmers code will function properly. Such a system thus maximizes the inherent advantages of object oriented methodologies by taking full advantage of their modularity and encapsulation.

Efforts to further extend the advantages of object oriented programming techniques have included the development of methodologies to enhance the modularity of programming objects. Once such effort has included development of the concept of relations or relationships between objects. Object relationships are associations between objects from one or more classes (Rumbaugh 1987). The use of relationships allows the object programmer to express clearly the associations and constraints among objects that would otherwise have to be buried in the implementation code of object, thereby reducing the modularity of the object. The externalization of references between objects that is provided by the use of relationships permits a symmetric, non-redundant model that combines the object oriented computing model with the entity relationship model that is found in database theory. Such strategies are particularly useful for modeling systems of interrelated objects, as these systems can be thought of in very natural terms. For example, the modeling of a document contained in a folder, which is a popular metaphor for file storage in many computer systems, can be modeled by relating a folder object with a document object through a "containment" relationship. Such a model expresses the relationships in a very natural manner to the real-world case of a folder in which is placed a document for storage.

The implementation of these concepts in distributed object oriented systems remains a difficult task. For example, methods are required to determine whether two or more object references are directed to the same object. The need to make such determinations is also relevant to the implementation of relationships among objects. Often it is useful for the programmer or system administrator to "map" the chain of relationships among associated objects.

Furthermore, with respect to the implementation of relationship methodologies and distributed object oriented systems methods must also exist to ensure that relationships are created among objects in a logically consistent manner. In other words, it is highly desirable to have a method that would prevent, e.g., a situation in which a document was placed in a containment relationship to a folder. Finally, it is also desirable to provide a method for identifying objects in relationships in a highly efficient manner so as to reduce the overhead imposed by the operating system.

SUMMARY OF THE INVENTION

The present invention includes methods and apparatus for managing relationships among objects in a distributed object system. Using the methods and apparatus of the invention the limitations imposed on such systems by the need to identify object references which refer to identical objects, provide for the logically consistent formation of relationships among objects and enhance system efficiency by providing for efficient identification of objects associated through relationships are addressed.

In one aspect, the present invention includes a computer implemented method for determining whether a first object is identical to a second object in a distributed object system including a first object reference residing in a process running in a computer memory, which first object reference refers to the first object, and a second object reference stored in a computer memory that refers to the second object. The method includes first providing an identifier for each of the first and second objects that is effective to identify uniquely those objects within the distributed object system. The object reference to the second object is then passed to the first object, which initiates a request to the second object for that object's unique identifier. The first object then determines if its unique identifier is identical to the second object's unique identifier. In a preferred embodiment, the unique identifier comprises a network address, a process identifier, a temporal value, and an incrementor value.

In another aspect, the present invention provides a computer implemented method for checking the consistency of a relationship to be created among two or more objects in a distributed object system. The method of the invention includes passing a role under computer control from each object to be related to a relationship factory mechanism effective to create the relationship among the objects. A determination is made as to whether each role passed to the relationship factory is of the appropriate type for the desired relationship. In a preferred embodiment, the method includes the steps of: creating a type check array; creating an expectation array; and performing a type check for each role passed to the factory. The type check includes comparing a role that is passed to the relationship factory with at least one expected role type to determine whether the passed role is of the same type of the expected role type, and incrementing an element of the type check array in response to a determination that the passed role is of the same type of the expected role type. The type check array is then compared against the expectation array to determine whether the role types passed to the relationship factory match the role types expected by the relationship factory.

In still another aspect, the present invention includes a computer implemented method for obtaining an object reference for a first object having a first object role which first object is related to a second object having a second object role, wherein the first and second objects are related by a relationship object. In the method, the object reference of the relationship object and the role name of the first object role are passed to the second object role. The relationship object reference and the first object role name are compared with entries contained in a data structure cached in the second object role to determine if the data structure includes the object reference for the first object. In a preferred embodiment, the method further includes querying the relationship object for the first object's role name as well as the object reference for the first object in response to determining that the first object role name is not included in the data structure cached with the second object role. The object reference for the first object is then stored in the data structure cached in the second object role.

In yet another aspect, the present invention includes a computer implemented method for obtaining the object reference for a first object role related to a first object which first object is related to a second object having a second object role by a relationship object. In the method, the object reference of the relationship object and the role name of the first object role are passed to the second object role. These are compared with entries contained in the data structure cached in the second object role to determine whether the object reference for the first object role is contained in the data structure.

The present invention also provides apparatus for determining whether two object references in the distributed object system refer to identical objects. The apparatus includes a first object reference associated with the first object and a second object reference associated with the second object; an identity mechanism for providing an identifier for each of the first and second objects which identifier is effective to identify uniquely each of the objects in a distributed object system; a communications medium for passing the second object reference to the first object, and for initiating a request from the first object to the second object for the unique identifier of the second object; and an identity checking mechanism for determining whether the first object's unique identifier is identical to the second object's unique identifier.

The present invention also includes an apparatus for checking the validity of a desired relationship to be created among two or more objects and the distributed object system. The apparatus includes a communications medium for passing a role from each object to be related to a relationship factory mechanism that is effective to create the desired relationship among the objects. A consistency evaluation mechanism determines whether the proper number of roles for the desired relationship have been passed to the relationship factory mechanism; and whether each role passed to the relationship factory is of the appropriate type for the desired relationship.

In still another aspect, the present invention includes an apparatus for obtaining the object reference for a first object having a first object role, which first object is related to a second object having a second object role by a relationship object. The apparatus comprises a communications medium for passing the object reference of the relationship object and the role name of the first object role to the second object role; and a comparator for comparing the relationship object reference and the first object role name with entries contained in the data structure cached in the second object role to determine whether the object reference for the first object role is contained in the data structure.

The present invention further includes an apparatus for obtaining the object reference for a first object role related to a first object which first object is related to a second object having a second object role by a relationship object. The apparatus includes a communications medium for passing the object reference of the relationship object and the role name of the first object role to the second object role; and a comparator for comparing the relationship object reference and the first object role name with entries contained in the data structure cached in the second object role to determine whether the object reference for the first object role is contained in the data structure.

These and other aspects and advantages of the present invention will become apparent when the description of specific embodiments below is read in conjunction with the accompanying figures.

BRIEF DESCRIPTION OF THE DRAWINGS

FIG. 7A illustrates a relationship in which a folder object contains a document object which document object contains a graphic object. FIG. 7B illustrates a relationship in which a folder object contains both a document object and a graphic object.

DESCRIPTION OF SPECIFIC EMBODIMENTS

Figure 1:
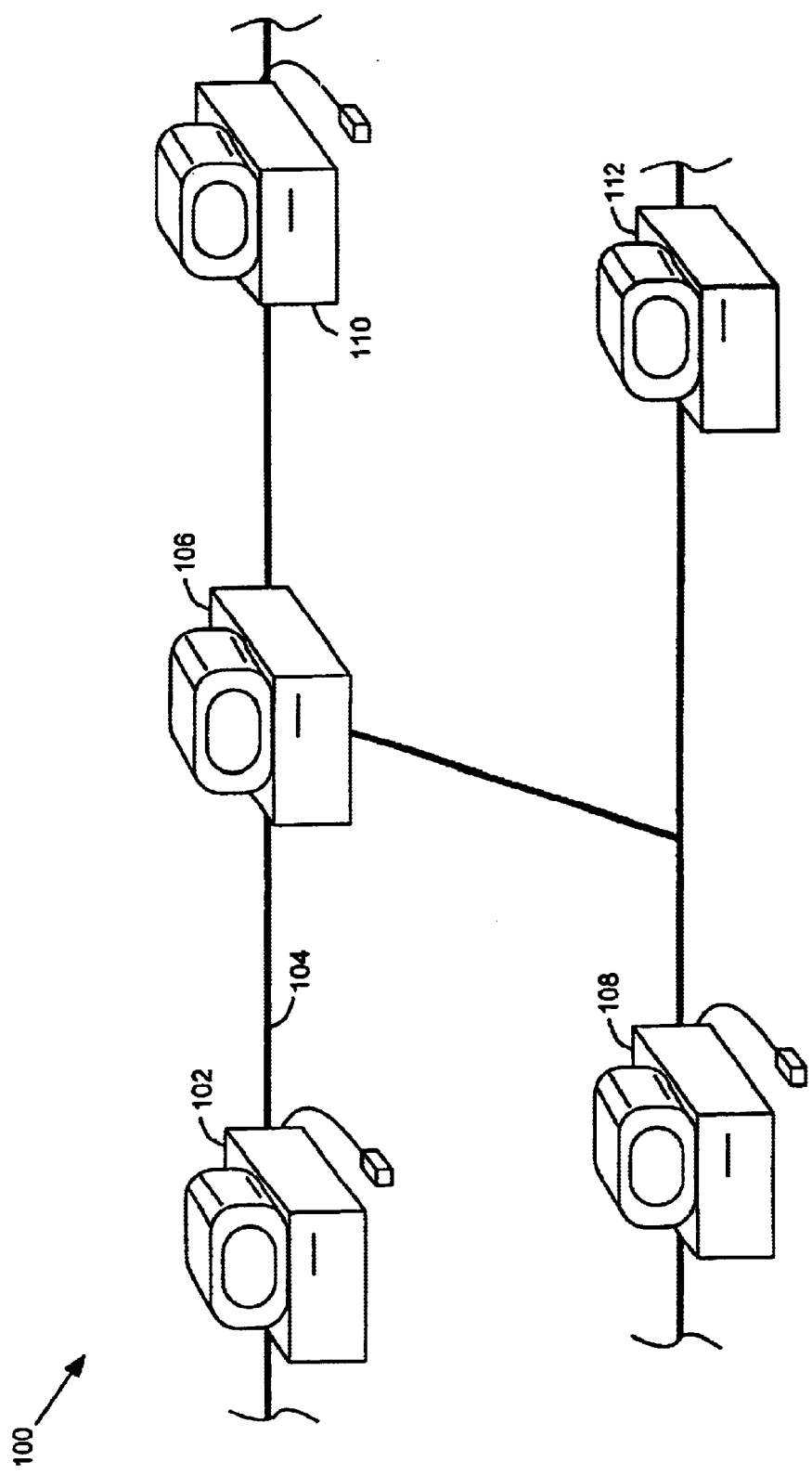
FIG. 1 is an illustration of various computers linked together in a computer network.

The present invention includes a method and apparatus for managing relationships among distributed objects in a distributed object environment. Using the methods and apparatus of the present invention, distributed objects in a distributed object environment may be handled across diverse platforms, operating systems, and machines in a consistent and efficient manner.

I. Definition of Terms

As used herein, the term "distributed object" or "object" refers to an encapsulated package of code and data that can be manipulated by operations defined in the interface distributed object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is IDL. Second, distributed objects are location-independent, i.e., distributed objects can be located anywhere in a network. This contrasts sharply with traditional programming objects which typically exist in a single address space: the address space of the client. Distributed objects can be object-clients or object-servers, depending upon whether they are sending requests to other objects or replying to requests from other objects. Requests and replies are made through an ORB that is aware of the locations and status of the objects.

A "distributed object system" or distributed object environment" refers to a system comprising remote objects that communicate through an object request broker (ORB) that is aware of the locations and status of the objects in the distrubuted object system. In a preferred embodiment, objects communicate using the methods described in co-pending U.S. patent application Ser. No. 08/996,784 entitled "Method and Apparatus for Managing Collections of Objects", by Dwight F. Hare, et al., filed Dec. 23, 1997; U.S. patent application Ser. No. 08/967,874, entitled "Method and Apparatus for Managing Connections for Communication Among Objects in a Distributed Object System" by David Brownell, et al., filed Nov. 12, 1997; and U.S. patent application Ser. No. 08/835,994, entitled-"DOMFD Server Start-Up" by Peter Vanderbilt, et al., filed Apr. 11, 1997. Each of these U.S. Patent Applications is incorporated herein by reference in its entirety. A preferred system architecture for implementing such an ORB is provided by the Common Object Request Broker Architecture (CORBA) specification. The CORBA specification is defined by the Object Management Group (OMG), a consortium of vendors including Sun Microsystems, Incorporated, Digital Electronics Corporation, Hyperdesk Corporation, Hewlett-Packard Corporation, SunSoft, NCR Corporation and Object Design, Incorporated. Under the CORBA, a distributed object system is defined in terms of a client-server model wherein target objects, or servers, provides services to clients that request such services.

An "object reference" or "obj ref" contains a pointer to another object. The creation and definition of object references will be familiar with those skilled in the art (SunSoft 1994).

A "client" as defined herein refers to an entity that sends a request to another object, which other object is referred to herein as a "server". Thus, clients invoke operations, or implementations, from servers. In a distributed object environment, clients need not have knowledge of the implementation programming language, nor does the implementation have to have knowledge of the client's programming language due to the requirement of multilingual character of such objects. Clients and servers in distributed object environments need only communicate in terms of the interface definition language. As noted above, the request by the client to the server, and the server's reply to the client, is handled by the ORB.

An "object interface," is a specification of the operations, attributes, and exceptions that an object provides. Preferably, object interfaces for distributed objects are written using, e.g., IDL. As noted above, objects perform transactions through their interfaces. The use of interfaces therefore relieves the need of objects that are aware of the programming languages used to define the methods and data of the objects in the transaction.

A "relationship" or "relationship object" is an object that forms an association between two or more objects that would otherwise be written in the implementation code of the associated objects (Rumbaugh 1987; Rumbaugh, et al. 1992). For example, a folder object (i.e., a directory) can hold a document object through a "containment" relationship. Each object in the relationship has a "role" which is expressed by a "role name". Relationship objects can be operated upon to affect all of the objects associated by the relationship without operating on each object in the relationship individually, thereby allowing for the use of concise expressions to manipulate multiple objects in a natural manner.

A "relationship service" is a set of facilities available on each machine in a distributed object system for establishing and managing relationships among the distributed objects of the distributed object system. In a preferred embodiment of the present invention, the methods described below are implemented in a relationship service in accordance with OMG TC Document 94.5.5. However, it will be appreciated that the methods and apparatus described below can implemented with relationship services that are designed in accordance with other specifications, or the methods and apparatus of the invention can be used alone or in combination outside of a relationship service.

II. Identity Checking In Distributed Object Environments

In a preferred embodiment of the present invention, distributed objects are located on one or more computers linked together by network such as the network illustrated at 100 in FIG. 1. As seen in the Figure, network 100 includes computer 102 which computer is coupled to a network 104. Network 104 can further include a server, router or the like 106 in addition to other computers 108, 110, and 112 such that data and instructions can be passed among the networked computers. The design, construction and implementation of computer networks will be familiar to those of skill in the art.

Figure 2:
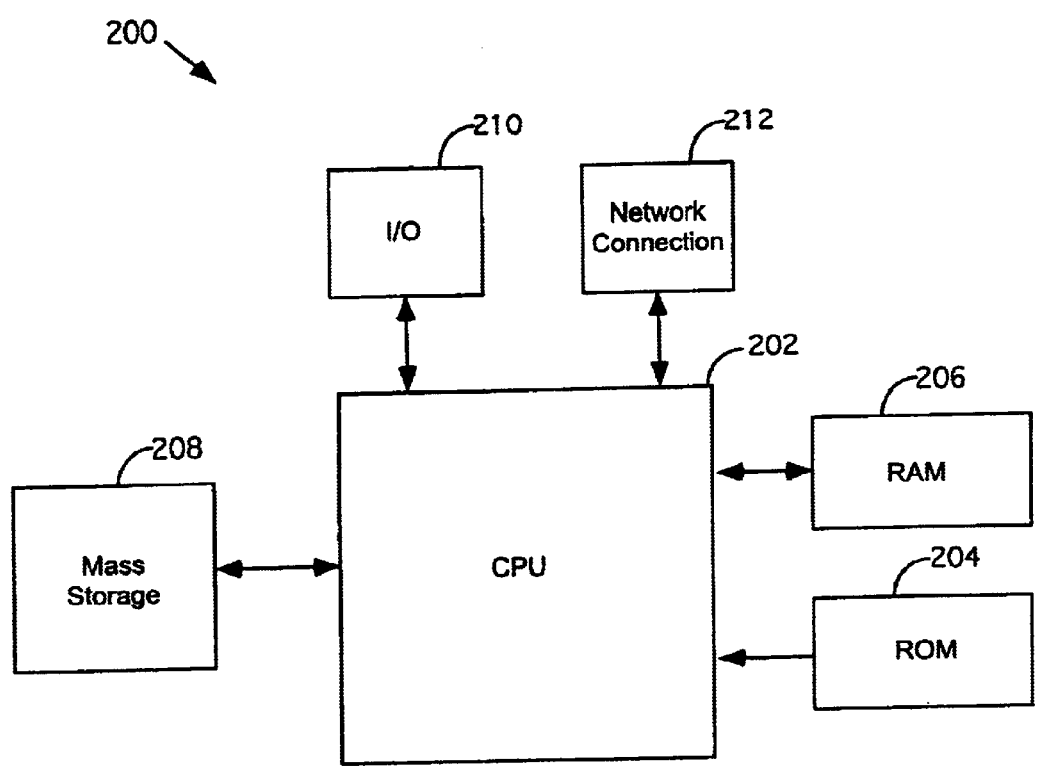
FIG. 2 illustrates diagramatically the major components of a computer in FIG. 1.

Computers 102, 106, 108, 110, and 112 are illustrated schematically with respect to FIG. 2 at 200. Each computer includes a central processing unit (CPU) 202 which CPU is coupled bidirectionally with random access memory (RAM) 204 and unidirectionally with read only memory (ROM) 206. Typically, RAM 204 includes programming instructions and data, including distributed objects and their associated data and instructions, for processes currently operating on CPU 202. ROM 206 typically includes basic operating instructions, data and objects used by the computer to perform its functions. In addition, a mass storage device 208, such as a hard disk, CD ROM, magneto-optical (floptical) drive, tape drive or the like, is coupled bidirectionally with CPU 202. Mass storage device 208 generally includes additional programming instructions, data and objects that typically are not in active use by the CPU, although the address space may be accessed by the CPU, e.g., for virtual memory or the like. Each of the above described computers further includes an input/output source 210 that typically includes input media such as a keyboard, pointer devices (e.g., a mouse or stylus) and the like. Each computer can also include a network connection 212. Additional mass storage devices (not shown) may also be connected to CPU 202 through network connection 212. It will be appreciated by those skilled in the art that the above described hardware and software elements, as well as networking devices, are of standard designing construction are well familiar.

Figure 3:
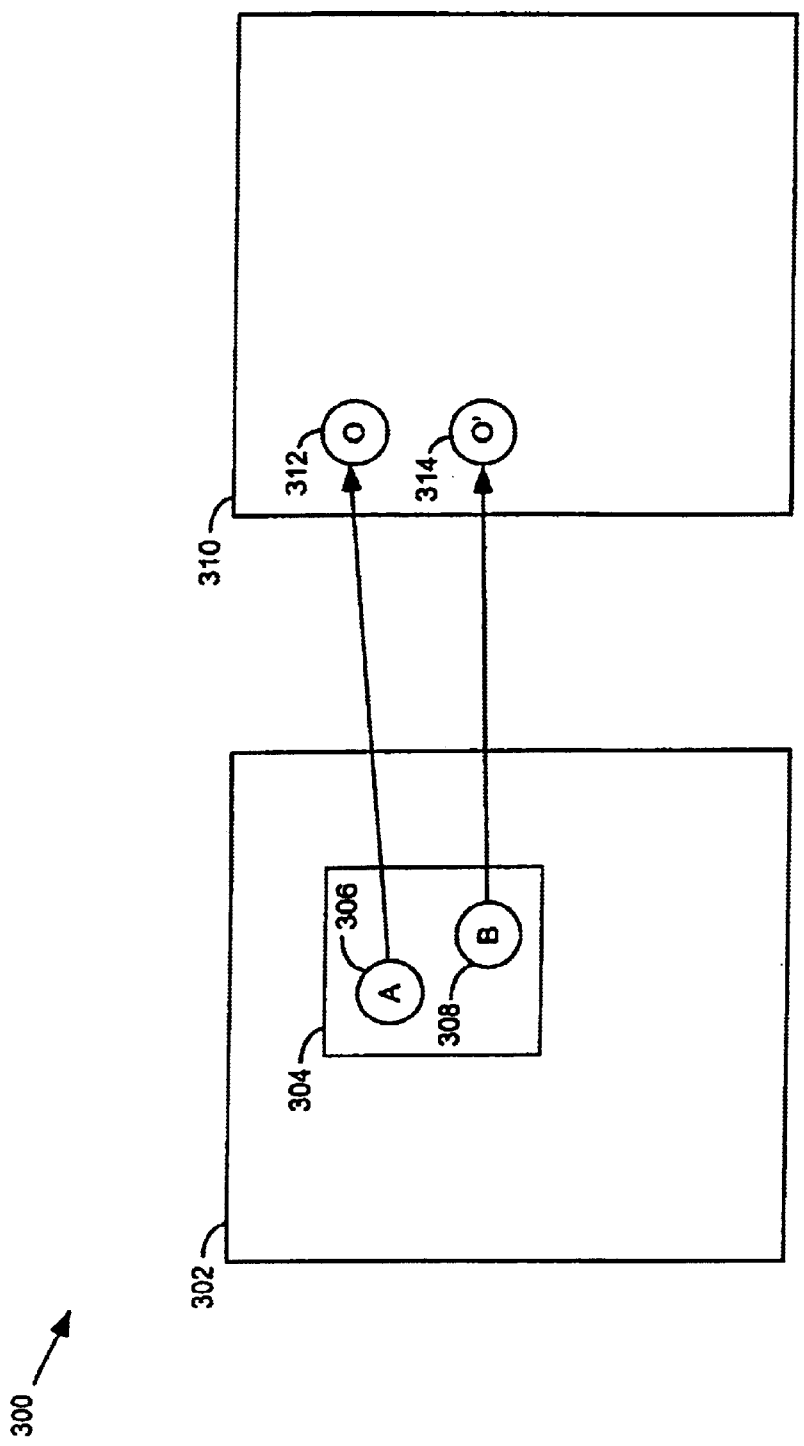
FIG. 3 is an illustration of two object references associated with a process running on a computer, which object references point to objects located at a remote memory location.

As noted above, the use of distributed objects leads to uncertainties as to whether two or more object references are directed to a single object. Such a scenario is illustrated in FIG. 3 at 300 where a first address space 302 contains a process 304 which process includes an object reference A, shown at 306, and an object reference B, shown at 308.

Object reference A contains the address of a first object O shown at 312 which object is located in address space 310. Object reference B includes the address of a second object O', that may be identical to object O, shown at 314 and located in address space 310. It will be appreciated that objects O and O' can be in different address spaces.

Figure 4:
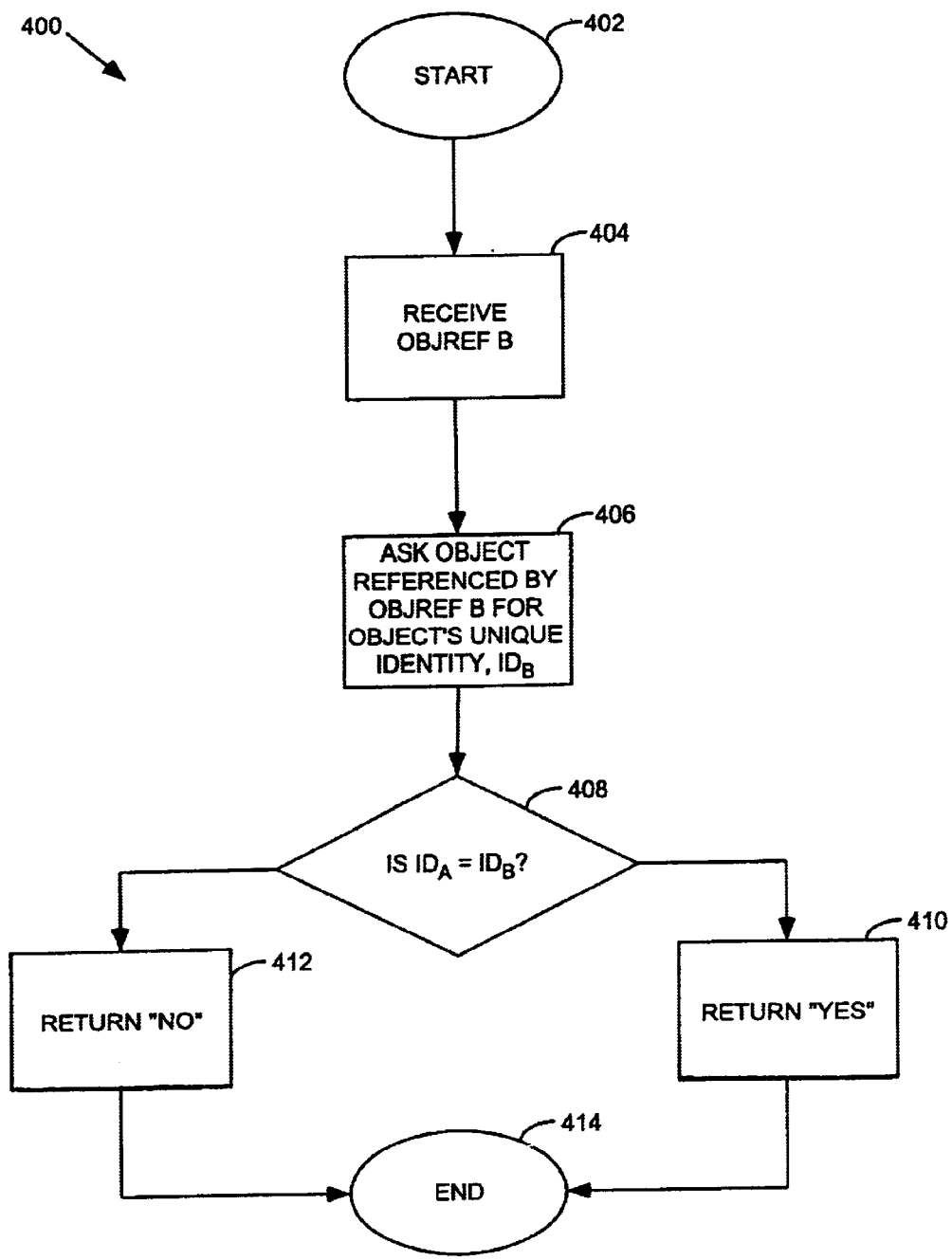
FIG. 4 is a flow diagram of a method for determining whether two object references point to identical objects.

FIG. 4 at 400 illustrates a method for distinguishing whether two object references (e.g., objrefs A and B in FIG. 3), respectively, actually refer to the same object through the incorporation of unique identifiers in each object. Beginning with initialization step 402, the object referred to by objref A receives objref B. At step 406, the second object, which is referenced by objref B, is queried by the first object, referenced by objref A, for the second object's unique identifier ($ID_B$). At step 408, the first object then determines whether its own unique identifier ($ID_A$) is identical to that of the identifier of the second object. If the two identifiers are equal an affirmative, answer is returned at 410; otherwise, a negative answer is returned at 412. The process ends at step 414.

Figure 5:
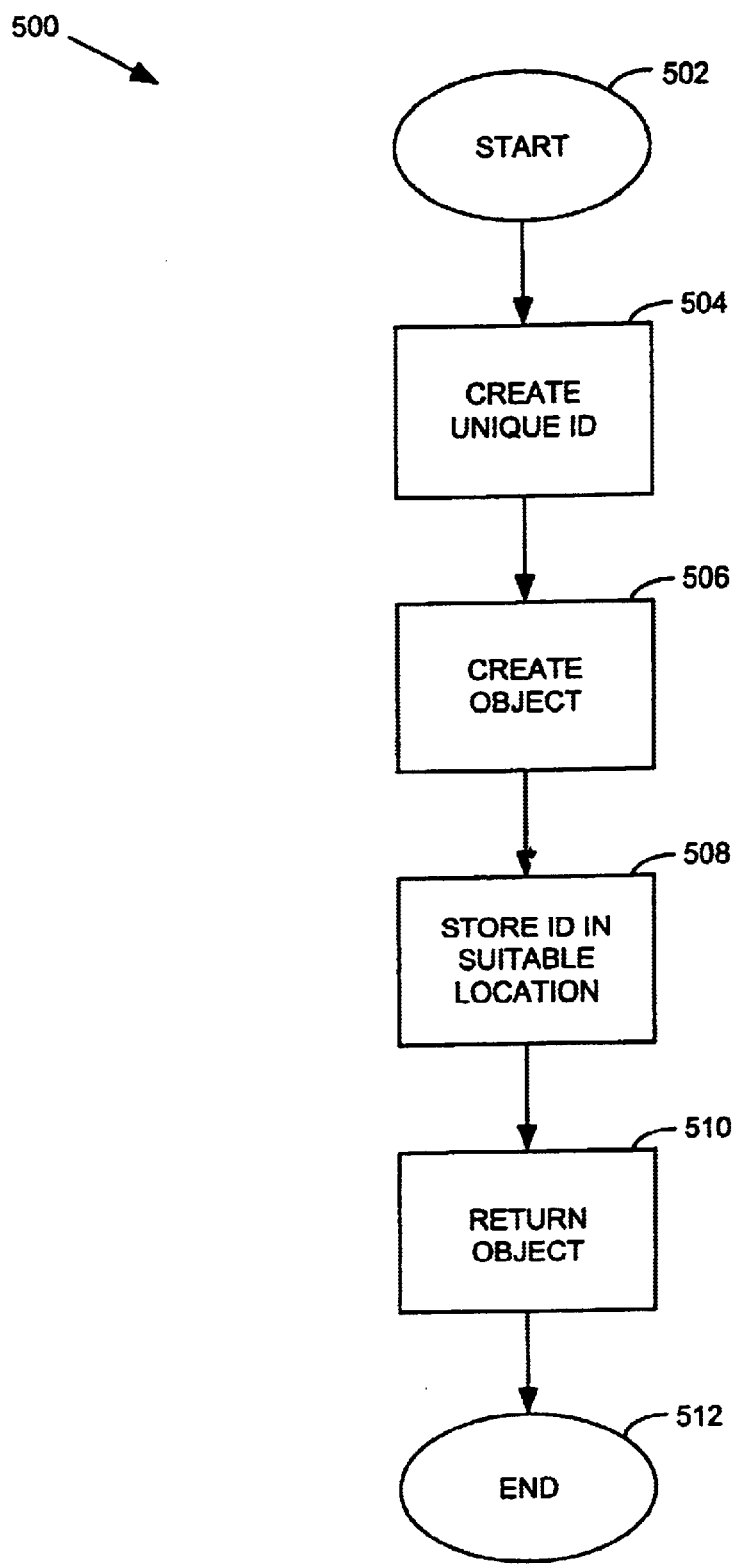
FIG. 5 is a diagrammatic illustration of a process for creating an object having a unique identifier for an object.

The creation of objects having unique identifiers is described in FIG. 5 at 500. Beginning with initialization step 502, creation of a unique ID for the object at step 504 precedes the creation of the object itself at step 506. At step 508, the unique ID is stored in a suitable location with respect to the object and the completed object is returned to the user at step 510 after which the procedure ends at step 512. It will be appreciated that the step of creating the unique ID and the step of creating the object may be reversed. In other words, the object may be created before the unique ID is created. The object identifier is preferably stored either in the reference data extension of the object or the persistent data storage associated with the object. However, it will be appreciated however that the unique ID may be stored in any location which is accessible to the object.

Figure 6:
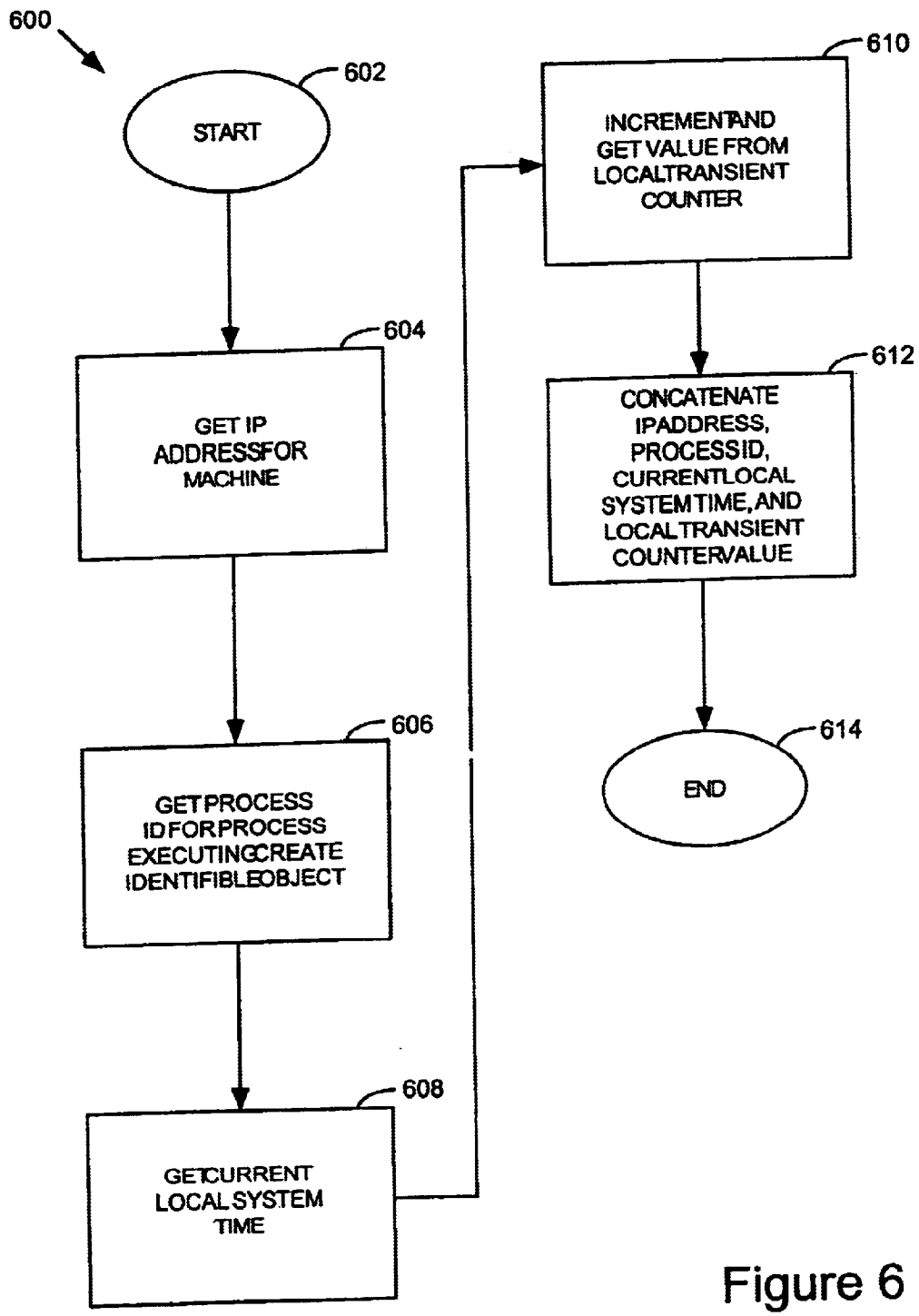
FIG. 6 is a detail of block 504 of FIG. 5.

The formation of the unique ID is described in FIG. 6 with respect to sequence 600. There, following initialization step 602, the network address for the machine on which the object is being created is obtained at step 604. Next, the process ID for the process that is creating the identifiable object is obtained in 606 and the current local system time is obtained at step 608. In addition, a value from an incrementor associated with the process is obtained at step 610 and the machine address, process ID, local system time and increment value are concatenated to form a single string at step 612, which string is stored in a memory location accessible to the object as described above with respect to step 508. Preferred memory locations include those locations for which access can be accomplished efficiently, such as the memory space assigned for persistent storage for the object. The use of persistent data storage will be familiar to those of skill in the art. Execution of sequence 600 terminates at step 614.

A preferred machine address is the network IP address for the machine and will be familiar to those of skill in the art. The process ID is obtained by querying the operating system of the machine in which the object is being created. The current system time is obtained typically by a call to the operating system of the system. Increment value 610 is obtained by calling a local counter, which counter differentiates various threads that are being executed simultaneously. These procedures will be familiar to those skilled in the art of multithreaded computing.

In a preferred embodiment, the above-described procedure is implemented in accordance with the specifications described in OMG TC Document 94.5.5, entitled "Relationship Service Specification". A preferred Relationship Service supports a CosObjectIdentity module which is defined as follows:

```
module CosObjectIdentity{
    typedef string ObejctIdentifier;
    interface IdentifiableObject {
        readonly attribute ObejctIdentifier
constant_random_id;
        boolean is_identical (
            in IdenfifiableObject other_object);
    };
};
```

Objects that support the IdentifiableObject interface implement an attribute of type ObjectIdentifier and the is_identical operation. The ObejctIdentifier is defined for each object in accordance with the procedures described above with respect to FIGS. 5 and 6. The machine address provides a unique identifier across all of the machines on the network, as each machine has a predefined network address. The process ID provides uniqueness across processes that are running on the same machine. However, it will be appreciated by those of skill in the art that process IDs on UNIX machines may be not unique over time, and thus present a possible degeneracy. This degeneracy is cured by referring to the local system time for processes which are launched at different times. However, for cases in which two or more strings are launched on the same process at approximately the same time, i.e., in which the launch times differ by an amount smaller than the granularity of the system clock, an incrementor provides an identifier for each thread that is independent of time. Thus, a string carrying all of the above described information will be seen to provide an identifier for an object that is unique with respect to other objects in the distributed object environment.

To compare the identifier of the other object with its own identifier, in a preferred embodiment the querying object performs the is_identical operation at step 408 of FIG. 4. The is_identical operation is defined below:

boolean is_identical (in IdentifiableObject other_object);

This operation returns "true" if the object and the other_object are identical, i.e., both objects have the same identifier. Otherwise the operation returns "false".

III. Consistency Checking For Relationship Formation Among Objects

In another aspect, the present invention includes a method and apparatus for checking the logical consistency of a relationship to be formed among two or more objects.

Figure 7A:
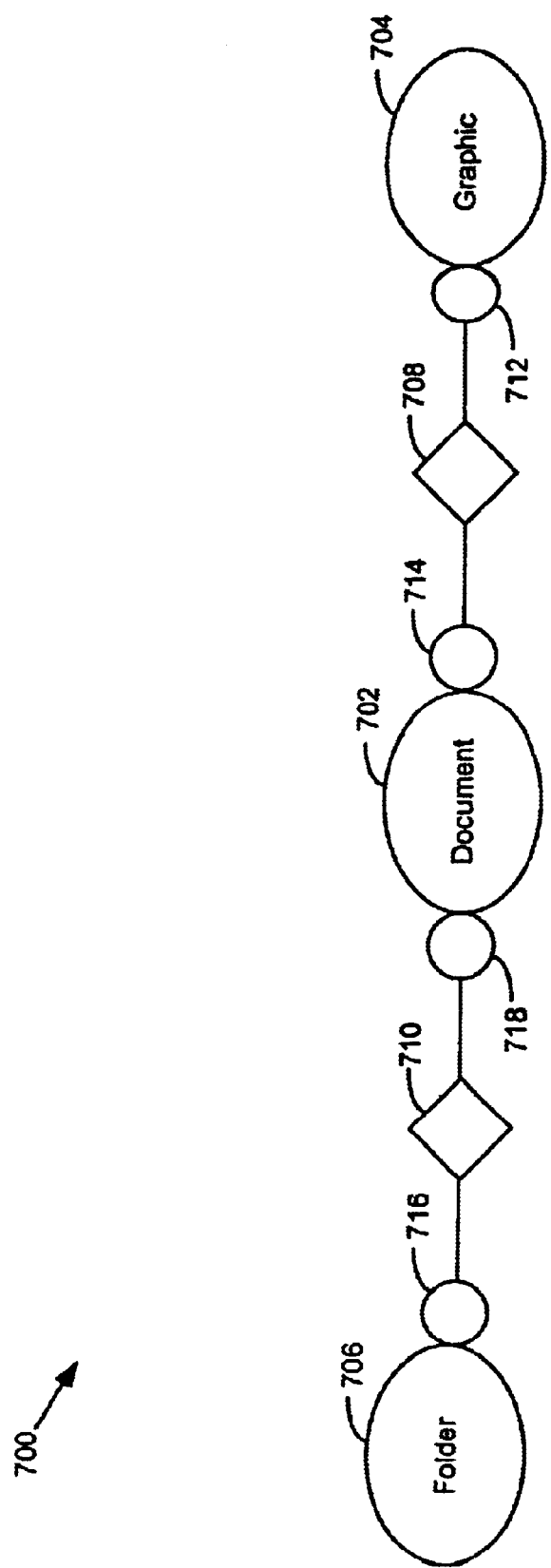
FIGS. 7A and 7B illustrate relationships among objects.
Figure 7B:
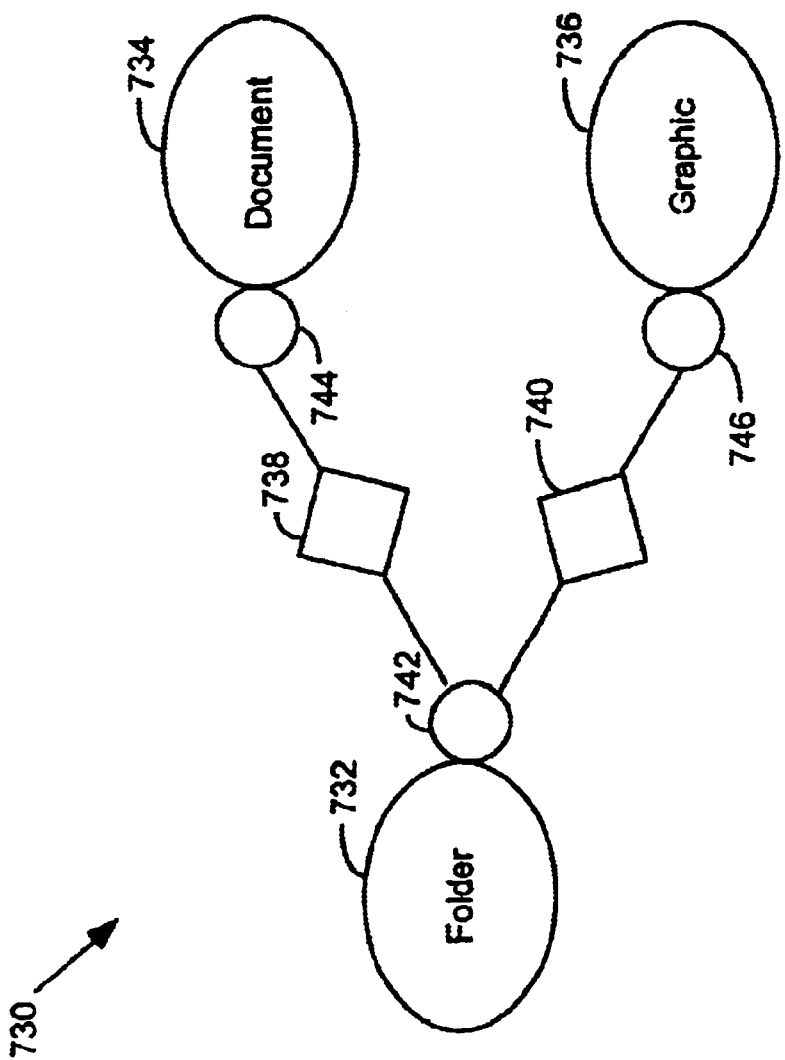

FIGS. 7A and 7B illustrate relationships between three different objects. As shown at 700 in FIG. 7A, a relationship is demonstrated among a document object 702, a graphic object 704, and a folder object 706. Document object 702 and Graphic object 704 are related through relationship object 708. Folder object 706 and document object 702 are related by relationship 710. Each object also has an associated role for each type of relationship in which the object participates. Thus, document object 702 has an associated role 714 with respect to relationship 708 and a second role 718 with respect to relationship 710. Folder object 706 has role 716 with respect to relationship 710 and Graphic object 704 has role 712 with respect to relationship 708. Relationships 708 and 710 typically are referred to as "containment" relationships. Roles 712 and 718 as commonly referred to as "contained-in" roles and roles 716 and 714 are often referred to as "contains" roles. The use of relationship objects to form associations among objects is well known in the art (Rumbaugh 1987; Rumbaugh 1991; Martin and Cattell 1994).

It will be appreciated that the use of relationship objects allows the most generalized use of each of the objects 702, 704 and 706, as each object can be associated through different relationships in different roles without modification of the object. A new role is simply associated with object for each new relationship. Thus, for example, FIG. 7B illustrates an alternative association of folder, document and graphic objects at 730 in which Folder object 732 holds Document object 734 and Graphic object 736 through containment relationship objects 738 and 740, respectively. In this example, Folder object 732 has only one role—a contains role—while Document object 734 and Graphic object 736 each have contained-in roles.

However, the formation of some relationships must be prevented in order to preserve logical consistency. For example, a software system might want to prevent a relationship in which a folder is contained in a document. In addition, it is necessary to ensure that each relationship formed includes the requisite number of roles. For example, a containment relationship could not be formed having only a contains role. Finally, the cardinality of the relationship, i.e., the number of relationship instances connected to a role, must also be consistent, as it would also be a breach of logical consistency to allow, e.g., a relationship in which two or more un-nested folders contained a single document. Thus, only relationships which are consistent with respect to the number, types and cardinality can be formed.

Figure 8:
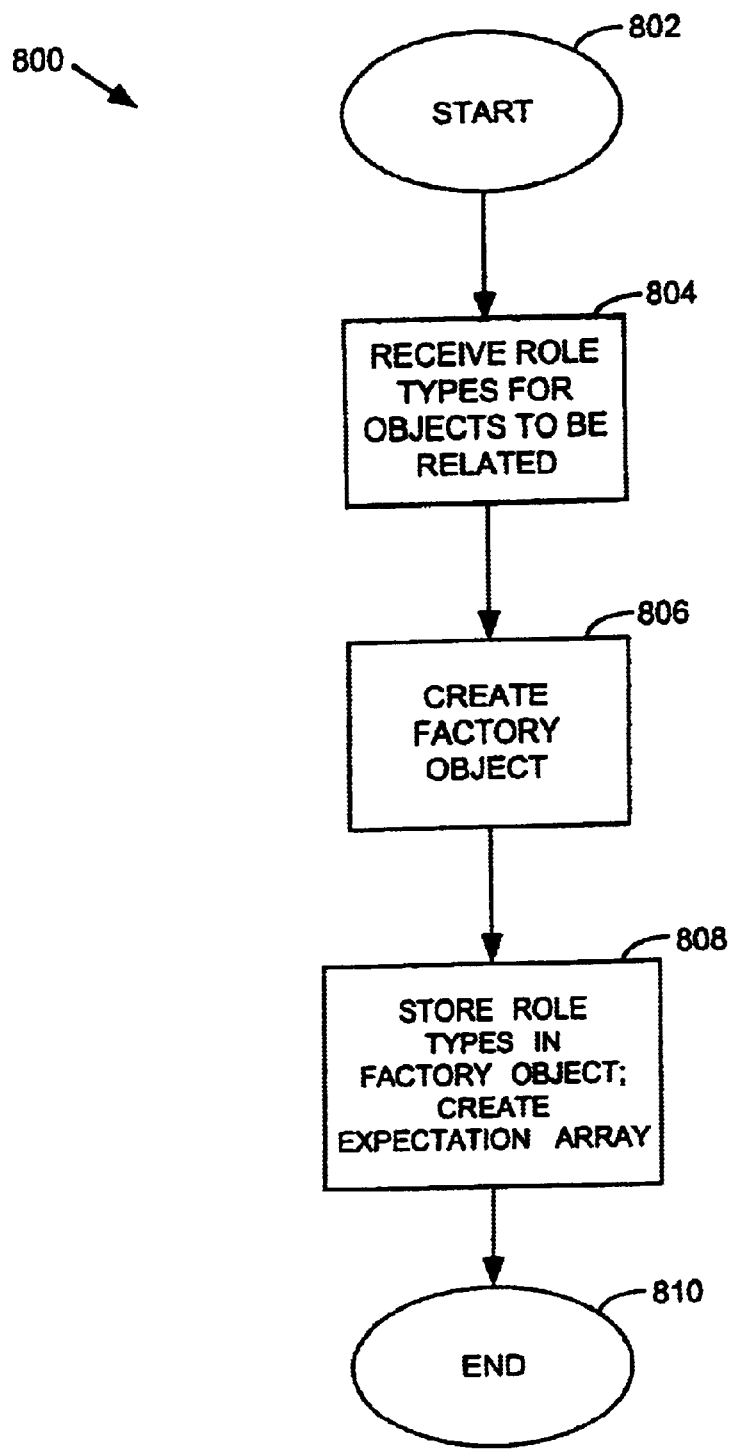
FIG. 8 illustrates schematically a process for providing stored role types in a factory object for generating relationship objects.

As is well known to those skilled in the art, relationship objects are created through the use of factory objects, which factory objects accept as arguments the objects to be related and their respective roles, and output the appropriate relationship object. The creation of such relationship factories is described with respect to FIG. 8 at 800. Starting at initialization step 802, the role types for the objects to be related through the relationship factory object are received by the factory object that creates the relationship factory at step 804. The relationship factory object is then created in step 806 and the role types are stored in the relationship factory object as an Expectation Array $[E_1, \ldots, E_N]$ where $E_i$ is a stored role type for the $i^{th}$ role and N is the degree of the relationship, at step 808 after which process is terminated at step 810.

Figure 9:
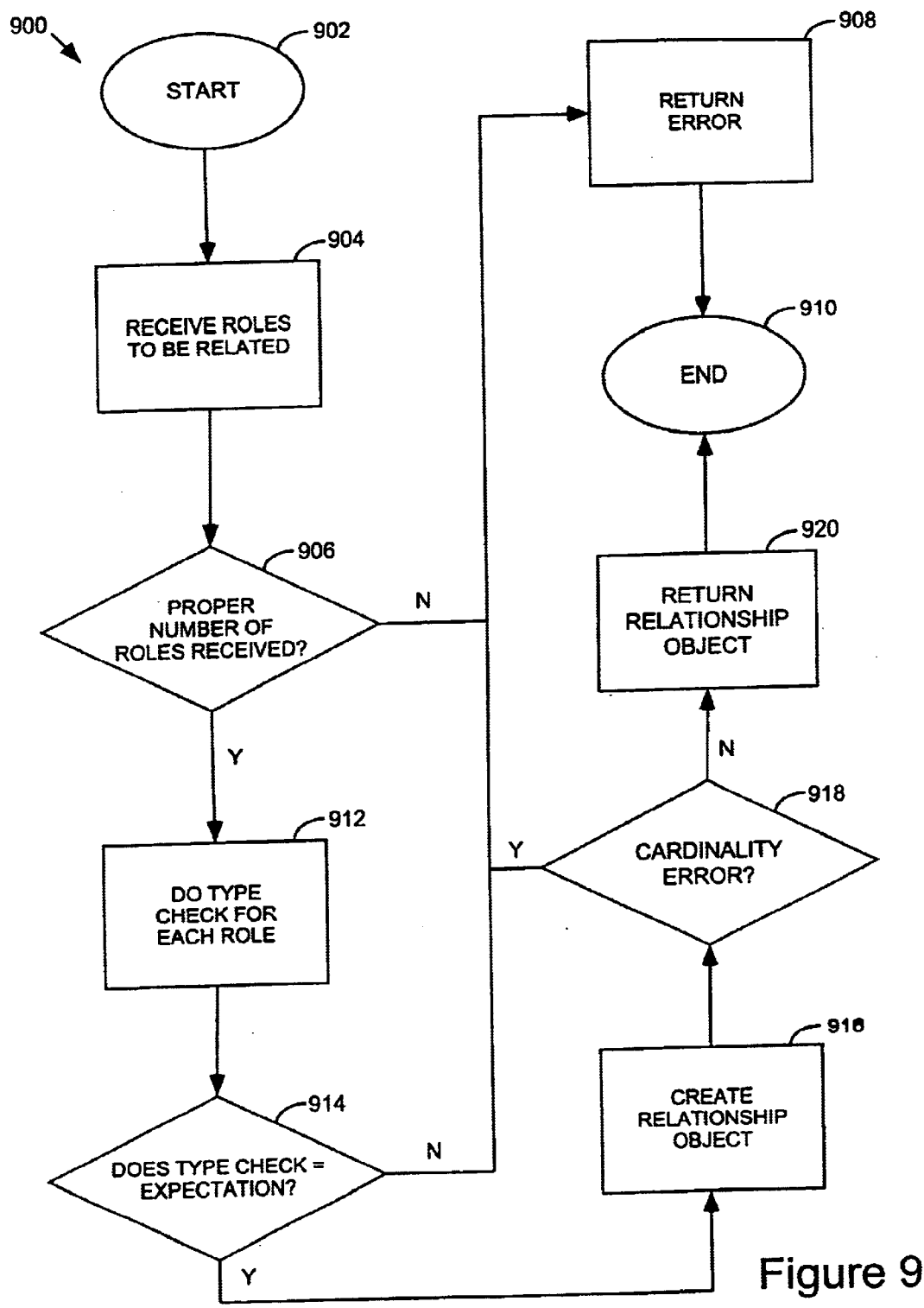
FIG. 9 illustrates a method for determining whether an appropriate number of roles and role types have been passed to a factory object effective for creating a relationship among two or more objects.

Turning now to FIG. 9 at 900, the method of checking the logical consistency of a relationship to be formed will be described. Beginning with initialization step 902, the roles of the objects to be related are received by the relationship factory object at 904. A determination is made at step 906 as to whether the proper number of roles for the relationship to be created has been received. If the proper number of roles has not been received, i.e., an error has occurred, the error is reported at 908 and the sequence terminates at step 910.

If the proper number of roles is received at 906, however, then, at step 912, a type check for each role is performed, and, at step 914, a determination is made as to whether the type check meets the expected output. In a preferred embodiment, the role types for the objects to be related are retrieved from an interface repository that holds descriptions of the interfaces of the objects and their type IDs. Alternatively, the objects could be queried directly by use of a narrow( ) or an is_a( ) operation. A preferred embodiment of the narrow( ) operation is described in U.S. patent application Ser. No. 08/408,633, entitled "Method and Apparatus for Determining the Type of an Object in a Distributed Object System" by Peter Vanderbilt, et al., filed Mar. 22, 1995 and is incorporated herein by reference. If the expectation is not met, then, at step 908, an error is returned and the process ends at step 910. If however, the type check does meet the expectation, then, at 916 the relationship object is created. At 918 check is made as to whether a cardinality error was returned during the relationship object creation step and an appropriate error is return at step 908 if the check is true. If there is no cardinality error, then the formed relationship object is returned at 920.

Figure 10:
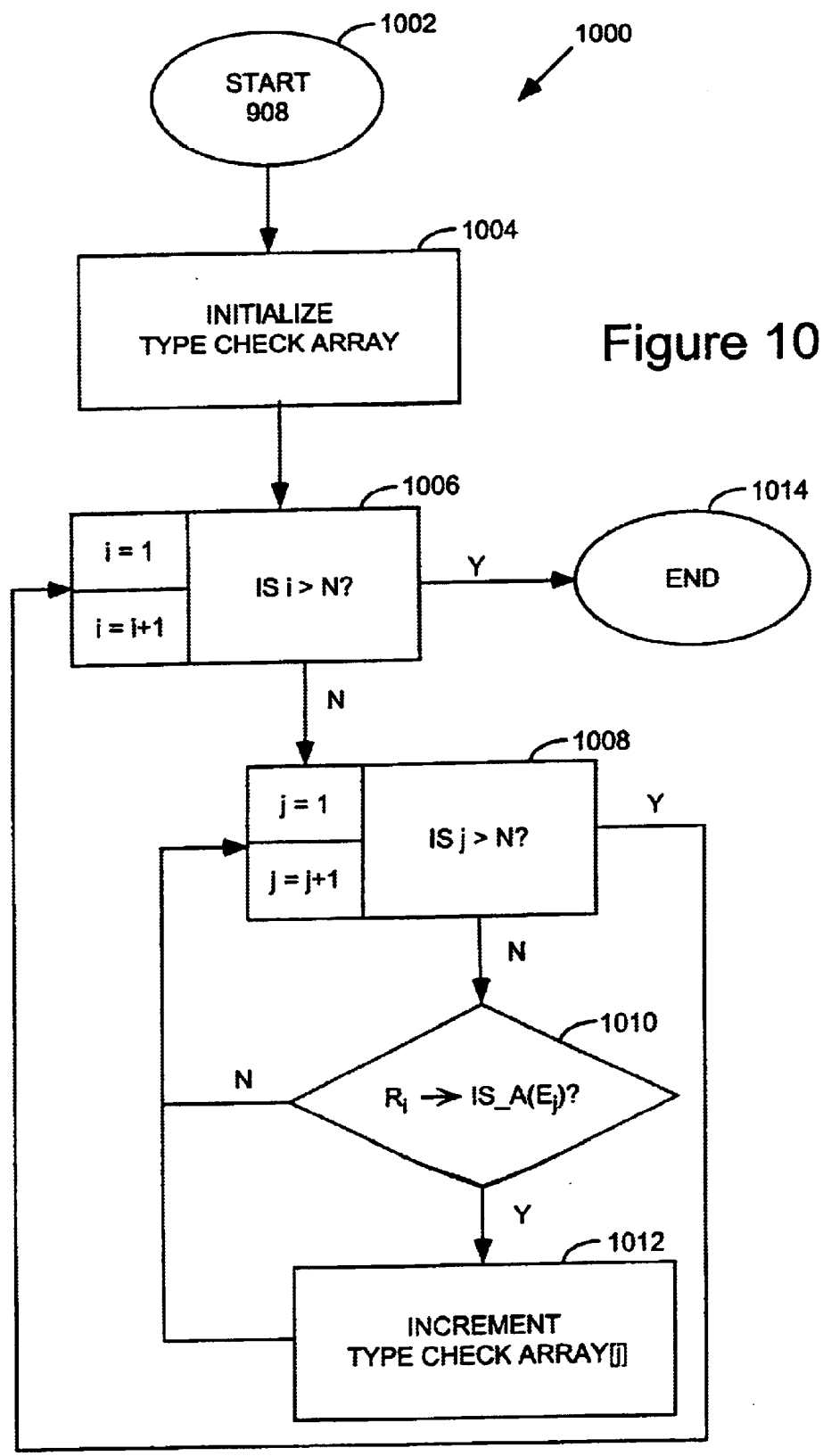
FIG. 10 is a diagrammatic illustration of the process described at step 908 of FIG. 9.

Type check step 908 is described in greater detail in FIG. 10 at 1000. Starting at initialization step 1002, a type check array having a dimension equal to the number of role types is initialized, e.g., all array components are set to 0, at step 1004. At step 1006, the expectation array $[E_1, \ldots, E_N]$ is retrieved and a first loop is defined whose loop index runs over the number N of roles that are received by the factory object. A second loop 1008 runs over the number of retrieved role types whose index is defined by j, wherein j runs from 1 to N. Within subloop 1008, a determination is made at step 1010 as to whether the role type received ($R_i$) is identical to the retrieved role type ($E_j$) by calling the function $R_i \rightarrow is\_a(E_j)$. As noted above, the role type may be obtained from an interface repository or directly from the object. If the determination at step 1010 is true, the value contained in the $j^{th}$ element of the type check array is incremented at step 1012, otherwise the loop index j is incremented and the next received role type is examined against the next stored role type. Once all N stored role types have been examined, the loop index i is incremented and the next received role type is checked against all of the stored role types. When all received role types have been checked against all stored role types, i.e., both loop indices have run from 1 to N, the process terminates at step 1014.

Figure 11:
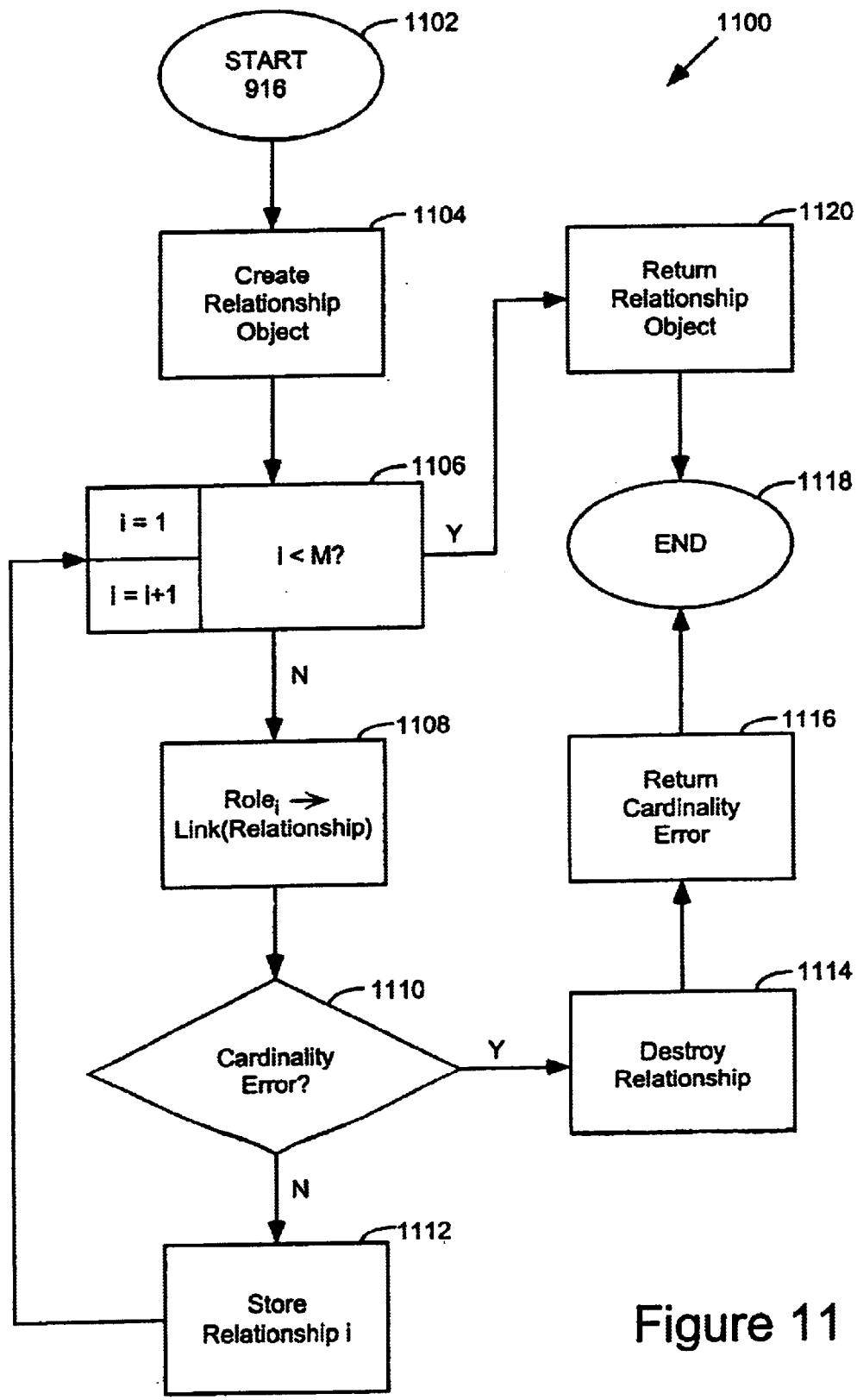
FIG. 11 illustrates step 916 of FIG. 9.

The creation of the relationship object, step 916 of FIG. 9, is illustrated in greater detail at 1100 in FIG. 11. Starting at 1102, the desired relationship object is created at step 1104 and a loop over the M roles to be linked to the relationship object begins at step 1106. Within loop 1106, the $i^{th}$ role is linked to the relationship object by the operation $Role_i \rightarrow Link(Relationship)$ at step 1108. A determination as to whether the $Role_i \rightarrow Link(Relationship)$ operation returned a cardinality error is made at step 1110. If no error is returned, the linked relationship is stored at step 1112 and next role is retrieved as the loop increments at step 1104. When all M roles have been linked successfully, the completed relationship object is returned at step 1120.

If, however, a cardinality error is returned at step 1110, the relationship object is destroyed at step 1114 and a cardinality error is returned at step 1116 before the procedure terminates at step 1118. It will be appreciated by those of skill in the art that the foregoing steps of creating relationship objects, linking roles to the objects, and checking the number, type and cardinality constraints can be implemented using known techniques.

Thus, for example, in the relationship described in FIG. 7A above, the sequence of expected role types stored in the relationship factory for either of the containment relationships 708 or 710 would be $\{E_1, E_2\}=\{CONTAINS, CONTAINED\_IN\}$, signifying that one role type must be a contains role and the other role a contained_in role. The received role types would also be $\{R_1, R_2\}=\{CONTAINS, CONTAINED\_IN\}$. The type check array would be a 1×2 array, with one column representing the number of contains roles received by the relationship factory and the other column representing the number of contained_in roles received. Initially the type check array would be [0,0], signifying that no contains roles or contained_in roles have been identified. The expectation array would also be a 1×2 array, but with the value [1,1 ], signifying that one each of a contains role and a contained_in role is expected.

Continuing with the example, if the first role ($R_1$) received by the relationship factory was a contains role, then, on the first pass through the double loop (i=j=1), the call $R_1 \rightarrow is\_a(E_1)$ would return a value of 1 or "true", since both $R_1$ and $E_1$ are contains roles. The first element of the type check array would then be incremented to yield [1,0]. On the second pass (i=1, j=2), however, the call $R_1 \rightarrow is\_a(E_2)$ would return 0, or "false", and the type check array would not change.

Similarly, on the second pass through loop index i, i=2, as the second role received ($R_2$) is a contained_in role, the call $R_2 \rightarrow is\_a(E_1)$ would return 0, or "false", and the type check array would not change. On the final pass, however, the call $R_2 \rightarrow is\_a(E_2)$ would return a value of 1 or "true", since both $R_2$ and $E_2$ are contained_in roles. The second element of the type check array would thus be incremented to yield the final result: [1,1]. Referring back to step 910 of FIG. 9, the comparison of the type check array against the expectation array would yield a "true" value and the relationship object would be formed.

If however, $R_1$ and $R_2$ were both contains roles, then the type check array would have a final value of [2,0] since true results would be returned only when j=1. Under this condition, the comparison of the expectation and type check arrays would yield false and an error would be returned. Similarly, if $R_1$ or $R_2$ was neither contains nor contained_in, an error also would be returned.

Once the checks for type and number are completed successfully, the relationship object is created and the roles are linked to the relationship object as described above. At this point, the cardinality for each of the roles to be linked to the relationship object is checked to ensure that the minimum and maximum cardinality constraints are met. As used herein, the minimum cardinality is the minimum number of relationship instances in which a role must participate. The maximum cardinality is the maximum number of relationship instances in which a role ma y participate. In the present example, each role $R_1$ and $R_2$ must participate in at least one relationship.

In a preferred embodiment, the steps outlined in the above-described example would be implemented using a RelationshipFactory interface of the CosRelationships module in accordance with OMG TC Document 94.5.5. This interface defines a create operation which takes as arguments a sequence of named roles that represent the related objects in the relationship to be created, as shown below:

Relationship create (in NamedRoles named_roles)
    raises (RoleTypeError,
        MaxCardinalityExceeded,
        DegreeError,
        DuplicateRoleName,
        UnknownRoleName);

The create operation of the CosRelationships module would be invoked to pass the named roles that represent the related objects in the relationship. In the present example, those roles would be the contains and contained_in roles associated with the Folder, Document and/or Graphic objects. A determination that the number of roles passed to the relationship factory was too few or too many would generate a DegreeError exception from the relationship factory. A determination that the role types passed to the relationship factory are in error would generate a RoleTypeError exception. A determination that cardinality is exceeded generates a MaxCardinalityExceeded error. Minimum cardinality can be checked using the check_minimun_cardinality( ) operation. If the number of roles, the role types and the cardinalities of the roles were in agreement with the relationship, the factory would create the relationship object and inform the roles using a link operation that passes to the role a relationship and a set of roles that represent the objects related in the relationship.

IV. Caching Object References for Objects and Roles In Relationships

In another aspect, the present invention includes a method and apparatus for caching object references (objrefs) and roles for the object(s) related to a given object by a relationship in the role of the given object. This caching increases the efficiency of navigation through a relationship as the objref and role to each of the other objects in the relationship can be found in the role of any one object. Without such caching, the role would have to send a request to the role for each of the other objects thus increasing the system overhead involved with traversal of a relationship.

Figure 12:
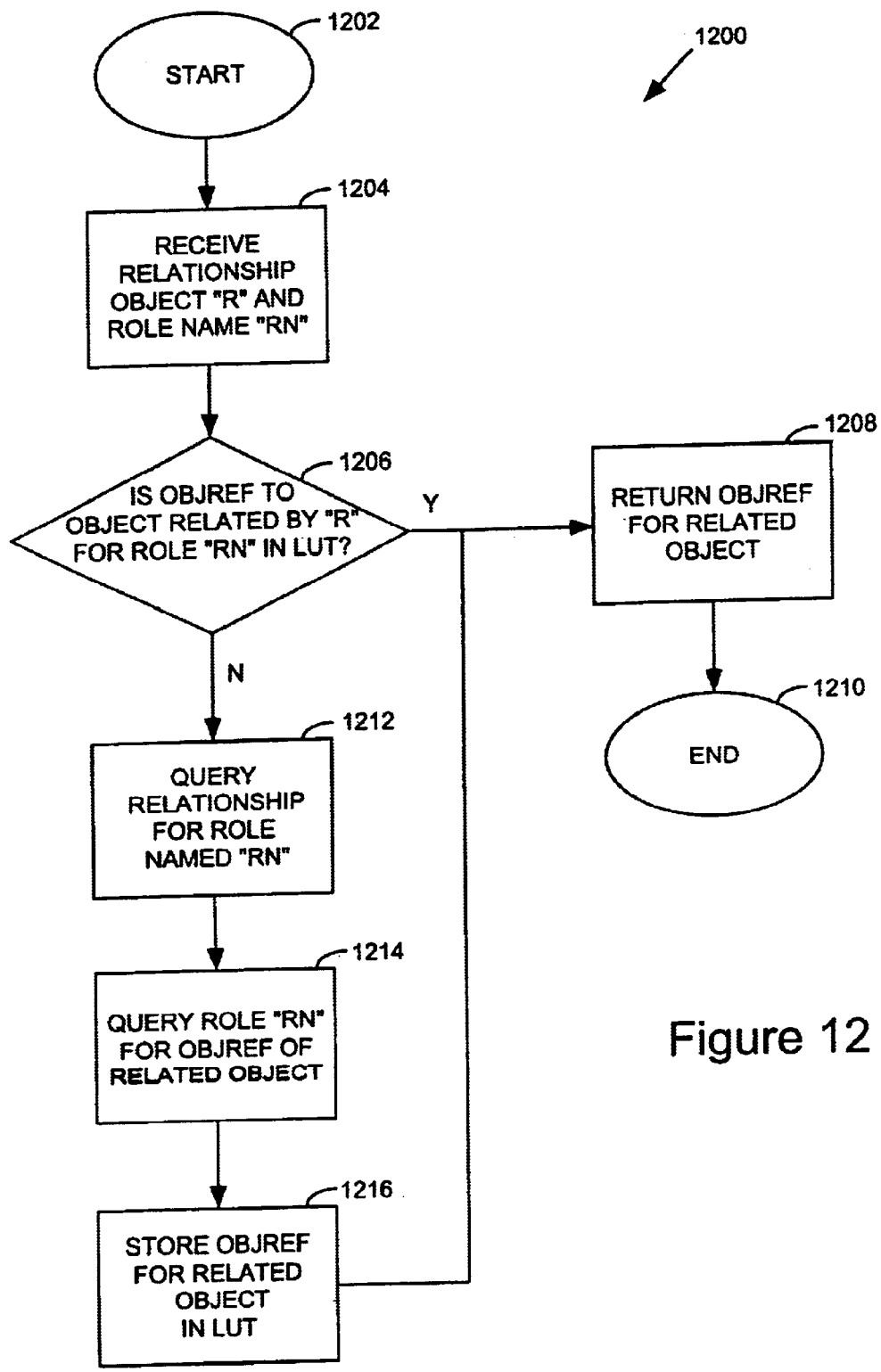
FIG. 12 is a diagrammatic illustration of a process for caching object references to an object in a relationship.

With respect to FIG. 12 at 1200, starting at initialization step 1202, the objref to a relationship object R and the role name RN of a first object that is related to a second object having a second object role by relationship object R are received by the second object role in step 1204. At step 1206, a determination is made as to whether an objref to the first object can be found in a look up table ("LUT") or cache associated with the second role. If the answer is true, then the objref is returned for the first object at step 1208 and program function terminates at step 1210. Otherwise, the relationship is queried for the role name RN at step 1212 and the role RN is then queried for the objref of the first object in step 1214. The objref is stored in the look up table referred to in step 1206.

In a preferred embodiment, the above described method is implemented in accordance with the Role Interface of the above-described CosRelationships module using the call get_other_related_object( ) having the form shown below:

RelatedObject get_other_related_object (in RealtionshipHandle rel, in RoleName target_name)
raises (UnknownRoleName, UnknownRelationship);

This operation navigates the relationship rel to the related object represented by the role named target_name to the related object. The exception UnknownRoleName is raised if target_name is not in the cache of the role being queried. If the role is unaware of the relationship, UnknownRelationship is raised.

Using the folder-document relationship described in FIG. 7A as an example, passing the call get_other_related_object( ) to contains role 716 of the Folder object 706, using as arguments an objref to containment relationship 710 and the role name "contains_in", would prompt role 716 to look up the objref for document 702 in a look-up table associated with the role object 716. If the objref for document object 702 was found, the objref would be returned. If the objref was not recorded, containment relationship 710 would be queried using the named_roles attribute which returns the roles of the relationship. The role is then queried using the related_object attribute to determine the objref of the related object. This objref is stored in the look-up table and returned.

Figure 13:
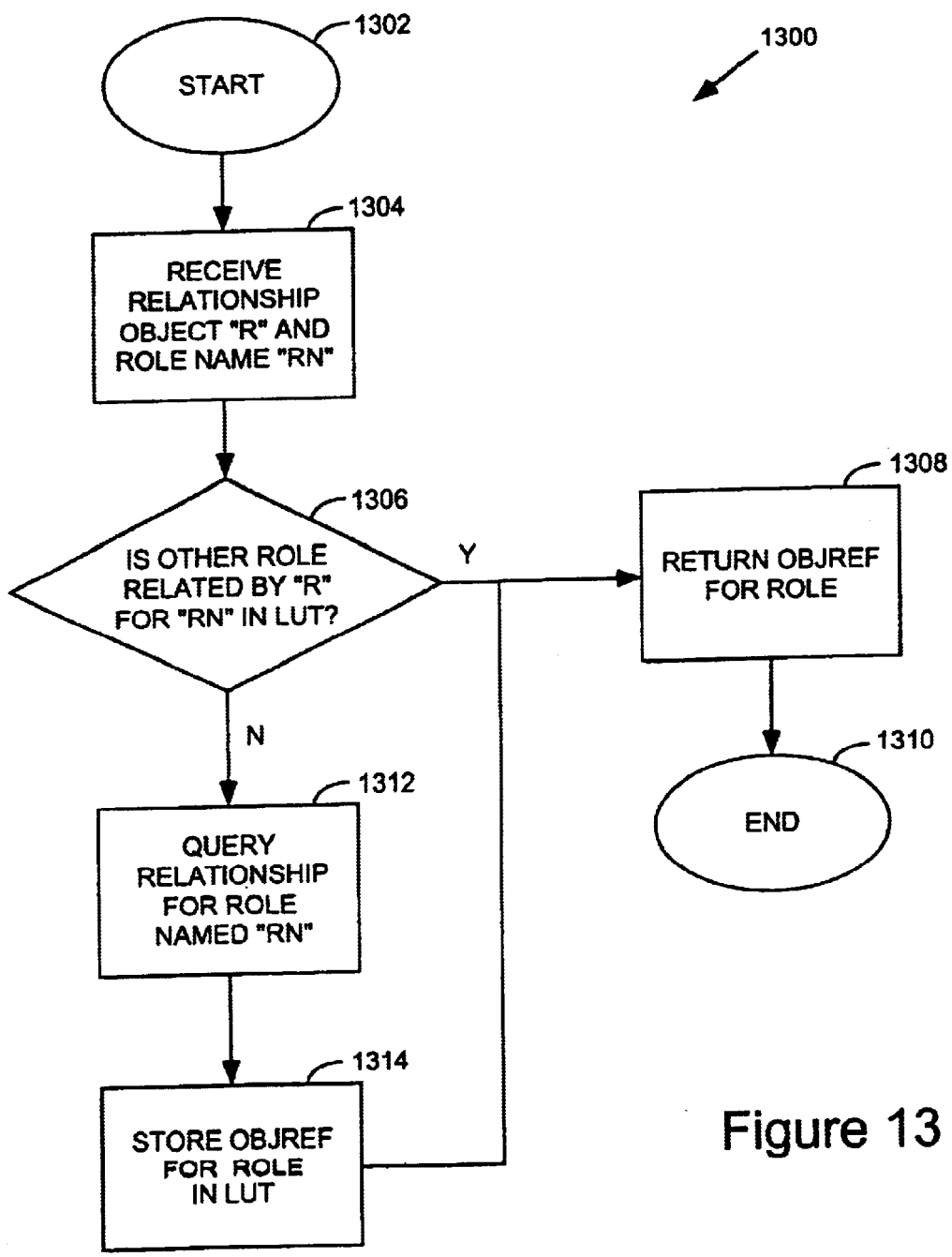
FIG. 13 is a diagrammatic illustration of a method for caching an object reference to a role associated with an object in a relationship.

The objref for a role related in a relationship to a first role can be determined in a similar manner. Referring now to FIG. 13 at 1300, beginning with step 1302, a instruction pathway similar to that described with respect to FIG. 13 is followed. At step 1304, an objref to a relationship object R and a role name RN are passed to the first role in step 1304. A determination is made as to whether the role that is related by R for the role name RN has already been stored in the look table at step 1306. If the answer is yes, then the objref for the role is returned to step 1308 and termination follows at step 1310. Otherwise, the relationship is queried for the role name RN in step 1312 and the objref for the role is then retrieved and stored in the look up table at step 1314.

In a preferred embodiment, the above described method is implemented in accordance with the Role Interface of the above-described CosRelationships module using the call get_other_role( ) having the form shown below:

Role get_other_role (in RealtionshipHandle rel, in RoleName target_name)
raises (UnknownRoleName, UnknownRelationship);

This operation navigates the relationship rel to the related object represented by the role named target_name to the role. The exception UnknownRoleName is raised if target_name is not in the cache of the role being queried. If the role is unaware of the relationship, UnknownRelationship is raised.

In a preferred embodiment, the above described method is implemented in accordance with the Role Interface of the above-described CosRelationships module. Using the folder-document relationship described in FIG. 7A as an example, passing the call get_other_role( ) to the contains role 716 of the Folder object 706, using as arguments an objref to the containment relationship 710 and the role name "contains_in", would prompt role 716 to look up the objref for document 702 in a look-up table cached with the role object 716. If the objref for contains_in role object 718 was found, the objref would be returned. If the objref was not recorded, containment relationship 710 would be queried using the named_roles attribute which returns the objrefs for the roles of the relationship. This objref is stored in the look-up table and returned.

Thus, it will be appreciated that the present invention provides important methods for managing relationships among objects across distributed object systems. Using the methods of the present invention, those of skilled in the art will appreciate that distributed objects stored at diverse memory location across networks can be identified uniquely, that relationships can be defined consistently between objects and that process operations can be speeded through the use of an automatic caching in which roles for related objects contain object references directed to the objects related to the roles.

Although certain embodiments and examples have been used to describe the present invention, it will be apparent to those of skill in the art that various changes can be made to those embodiments and examples without departing from the scope or spirit of the invention.

TABLE OF REFERENCES

The following materials are incorporated herein by reference for all purposes.

Interface User's Guide and Reference: Project DOE External Developer's Release 2. 1994. SunSoft.

Joint Object Services Submission: Relationship Service Specification. 1994. OMG TC Document 94.5.5.

Gibbs, W. W. 1994. Trends in Computing: Software's Chronic Crisis. Scientific American 271(3): 86–95.

Martin, B. E., and Cattell, R. G. G. 1994. Relating Distributed Objects. In Proceedings of the $20^{th}$ VLDB Conference, Santiago, Chile, 1994.

Taylor, D. 1990. *Object Oriented Technology: A Manager's Guide*. Addison Wesley.

Rao, B. R. 1993. *C++ and the OOP Paradigm*. M$^c$Graw-Hill.

Rumbaugh, J. 1987. Relations as Semantic Constructs in an Object-Oriented Language. In OOPSLA '87 *Conference Proceedings*. ACM Press.

Rumbaugh, J., et al. 1991. *Object-Oriented Modeling and Design*. Prentice Hall.

What is claimed:

1. In a distributed object system including a plurality of computers interconnected on a computer network in which a first object reference is stored in a memory of a computer, which first object reference refers to a first object residing in a computer controlled process running in a computer memory, and a second object reference is stored in a computer memory, which second object reference refers to a second object residing in a computer controlled process running in a computer memory, a computer implemented method for determining whether said first object is identical to said second object, the method comprising the steps of:
   a) providing under computer control an identifier for each of said first and said second objects, said identifier being effective to identify uniquely said first object and said second object in said distributed object system;
   b) storing said first object's unique identifier such that said first object's unique identifier is accessible to said first object;
   c) storing said second object's unique identifier such that said second object's unique identifier is accessible to said second object;
   d) passing under computer control said second object reference to said first object;
   e) initiating under computer control a request from said first object to said second object for said second object's unique identifier using said second object reference; and
   f) determining by said first object and under computer control whether said first object's unique identifier is identical to said second object's unique identifier, said determination step being implemented by and performed within said first object.

2. The method of claim 1, wherein providing under computer control said identifier for each of said first and said second objects comprises determining under computer control the values of:
   a) a network address,
   b) a process identifier,
   c) a temporal value indicating a local current system time, and
   d) an incrementor value obtained from a counter that differentiates between a plurality of threads that are simultaneously executed, the incrementor value being associated with one of the plurality of threads, thereby enabling said identifier for each of said first and said second objects to be generated from said network address, said process identifier, said temporal value, and said incrementor value.

3. The method of claim 2, wherein said network address device is an IP address of a computer on said network.

4. The method of claim 3, wherein for each object said step of providing under computer control said identifier for each of said first and said second objects comprises the steps of:
   a) determining under computer control said IP address for the computer in which said object is created;
   b) determining under computer control the value of said process identifier of the process creating said object;
   c) determining under computer control the local current system time;
   d) determining under computer control the current value of said incrementor value; and
   e) concatenating under computer control said IP address, said process identifier value, said local current system time and said current value of said incrementor value to form thereby said identifier.

5. The method of claim 4, further including the step of storing under computer control said identifier in a memory space associated with said object, said memory space being contained in a computer on said network.

6. The method of claim 5, wherein said identifier is stored in a persistent data structure cached with said object.

7. An apparatus for determining whether two object references residing in processes running on one or more computers interconnected in a network in a distributed object system refer to identical objects, comprising:
   a) a first object reference mechanism associated with a first object, and a second object reference mechanism associated with a second object;
   b) an identifier mechanism for each of said first and said second objects, said identifier mechanism being effective to identify uniquely said first object and said second object in said distributed object system, wherein said identifier mechanism for said first object is stored such that said identifier mechanism for said first object is accessible to said first object and wherein said identifier mechanism for said second object is stored such that said identifier mechanism for said second object is accessible to said second object;
   c) a communications medium through which is passed under computer control said second object reference to said first object and through which communications medium a request is sent from said first object to said second object for said second object's unique identifier using said second object reference; and
   d) an identity checking mechanism for each of said first and said second objects to determine under computer control whether said first object's unique identifier is identical to said second object's unique identifier, wherein said identity checking mechanism for said first object is implemented within said first object, and said identity checking mechanism for said second object is implemented within said second object.

8. The apparatus of claim 7, wherein said identifier mechanism comprises:
   a) a network address,
   b) a process identifier,
   c) a temporal value indicating a local current system time, and
   d) an incrementor value obtained from a counter that differentiates between a plurality of threads that are simultaneously executed, the incrementor value being associated with one of the plurality of threads, thereby enabling said identifier mechanism for each of said first and said second objects to be generated from said network address, said process identifier, said temporal value, and said incrementor value.

9. The apparatus of claim 8, wherein said network address is an IP address.

10. The apparatus of claim 8, wherein said indentifier mechanism is located in a memory space associated with said object.

11. The apparatus of claim 10, wherein said identifier mechanism is located in a persistent data structure cached with said object.

12. In a distributed object system including a plurality of computers interconnected on a computer network in which a first object reference is stored in a memory of a computer, which first object reference refers to a first object residing in a computer controlled process running in a computer memory, and a second object reference is stored in a computer memory, which second object reference refers to a second object residing in a computer controlled process running in a computer memory, a computer readable medium containing program instructions for determining whether said first object is identical to said second object, the program instructions including instructions for performing the steps comprising:

a) providing under computer control an identifier for each of said first and said second objects, said identifier being effective to identify uniquely said first object and said second object in said distributed object system;

b) associating said first object's unique identifier with said first object such that said first object's unique identifier is accessible to said first object;

c) associating said second object's unique identifier with said second object such that said second object's unique identifier is accessible to said second object;

d) passing under computer control said second object reference to said first object;

e) initiating under computer control a request from said first object to said second object for said second object's unique identifier using said second object reference; and f) determining under computer control whether said first object's unique identifier is identical to said second object unique identifier, said determination step being implemented by and performed within said first object.

13. The computer readable medium as recited in claim 12, wherein providing under computer control said identifier comprises determining under control the values of:

a) a network address, b) a process identifier, c) a temporal value indicating a local current system time, and d) an incrementor value obtained from a counter that differentiates between a plurality of threads that are simultaneously executed, the incrementor value being associated with one of the plurality of threads, thereby enabling said identifier for each of said first and said second objects to be generated from said network address, said process identifier, said temporal value, and said incrementor value.

14. The computer readable medium as recited in claim 13, wherein said network address is an IP address of a computer on said network.

15. The computer readable medium as recited in claim 14, wherein for each object said step of providing an identifier comprises the steps of:

a) determining under computer control said IP address for the computer in which said object is created;

b) determining under computer control the value of said process identifier of the process creating said object;

c) determining under computer control the local current system time;

d) determining under computer control the current value of said incrementor value; and e) concatenating under computer control said IP address, said process identifier value, said local current system time and said current value of said incrementor value to form thereby said identifier.

16. The computer readable medium as recited in claim 15, further including the step of storing under computer control said identifier in a memory space associated with said object, said memory space being contained in a computer on said network.

17. The computer readable medium as recited in claim 16, wherein said identifier is stored in a persistent data structure cached with said object.

18. The method as recited in claim 2, wherein the process identifier is unique across a plurality of processes running on the machine identified by the network address.

19. The apparatus as recited in claim 8, wherein the process identifier is unique across a plurality of processes running on the machine identified by the network address.

20. The computer readable medium as recited in claim 13, wherein the process identifier is unique across a plurality of processes running on the machine identified by the network address.

* * * * *